United States Patent Office 3,552,031
Patented Jan. 5, 1971

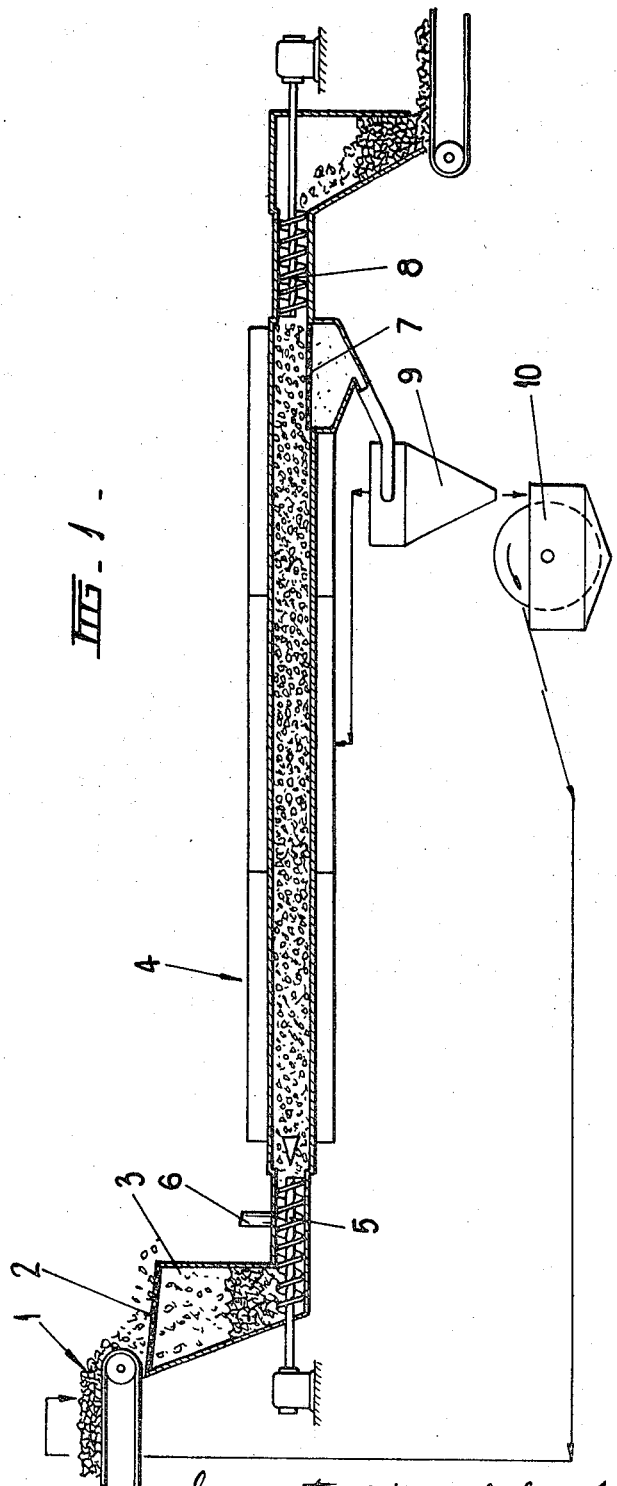

3,552,031
SEPARATION OF WATER FROM SOLID
ORGANIC MATERIALS
David Gordon Evans, Ringwood, Victoria, and Stanley
Robert Siemon, Mount Waverley, Victoria, Australia,
assignors to The University of Melbourne, Melbourne,
Victoria, Australia, a body corporate
Filed Dec. 30, 1968, Ser. No. 787,865
Claims priority, application Australia, Jan. 26, 1968,
32,607/68
Int. Cl. F26b 3/00
U.S. Cl. 34—9      4 Claims

ABSTRACT OF THE DISCLOSURE

Water is separated from solid organic material, for example brown coal as mined by treatment in the presence of a fluid medium at an elevated temperature and a pressure exceeding the saturation pressure but below 5000 p.s.i.

---

This invention relates to the separation of water from solid organic materials and is particularly applicable to dewatering brown coal.

The invention will accordingly be described with special reference to brown coal but it will be appreciated that the process steps hereinafter described are applicable to the separation of water from other solid organic materials containing same.

Brown coals in Victoria (Australia) are very cheap to mine as they occur in thick deposits near the surface, and can be mined by open cut methods. For example, opencut coal from Yallourn, Victoria, costs about 75 cents (Australian) per ton (2240 pounds) to mine.

Against this their calorific value is very low compared with other coals, mainly due to the large amount of water in the coal as mined. For example, the calorific value of dry Yallourn coal is about 11,200 British thermal units (B.t.u.) per pound, but each pound of coal as mined contains only one third of a pound of dry coal together with two thirds of a pound of water. Thus, the calorific value of the dry coal in one pound of coal as mined is only one third of 11,200, that is, 3,730 B.t.u.

The overall result is that the coal is still a very valuable fuel in terms of the cost of available heat. On the basis of the above figures the heat available for a cost of one cent is $$2240/75 \times 3730 = (2240 \times 3730)/75 = 112,000 \text{ B.t.u.}$$

However, in current practice not all this heat is available as useful heat, as some of it is used to evaporate off the two thirds of a pound of water from the one third of a pound of dry coal. The amount of heat required for this is about 1100 B.t.u. per pound of water evaporated or $$1100 \times \tfrac{2}{3} = 730 \text{ B.t.u.}$$

for two thirds of a pound. Therefore the usable calorific value of brown coal as mined is reduced to (3730−730)=3000 B.t.u. per pound and the heat available for one cent is therefore only $$(2240 \times 3000)/75 = 90,000 \text{ B.t.u.}$$

If a way of removing this water without evaporating it could be found the calorific value of the fuel available for one cent would thereby be increased by 22,000 B.t.u., i.e. an improvement of $$\frac{22,000}{90,000} \times 100 = 25\%$$

It is known that water separates from brown coal under pressures similar to those encountered in natural metamorphism of lignite to vitrain, that is to say, upwards of 5,000 p.s.i. It was hitherto believed that the process was facilitated by even higher pressures.

We have now found that under suitable conditions of elevated temperature, water contained in brown coal as mined can be separated therefrom at much lower pressure provided only that the pressure is above the saturation pressure at the temperature employed. Under these conditions the removal of water is independent of pressure. The proportion of water separated is greater at higher temperatures and operation at temperatures in the region of 250° C. is commercially attractive. At this temperature the saturation pressure of water is 600 p.s.i.a.

The coal may be heated in an autoclave with the chosen fluid at an appropriate elevated temperature and pressure. Under these conditions water does not evaporate from the coal but some liquid water separates and may be run off in a suitable manner.

The invention accordingly provides a process for separation of water from solid organic material characterized in that the said material is treated in the presence of a fluid medium at an elevated temperature and a pressure exceeding the saturation pressure but below 5000 p.s.i. whereby liquid water is separated therefrom.

The fluid medium may be gaseous, e.g. nitrogen, but liquids are preferred and suitable liquids include mineral oil, water itself and liquid metals. Water is a particularly convenient fluid medium for this purpose.

The pressure is preferably not greatly in excess of the saturation pressure.

Preferred temperatures are in the range 100° to 300° C., more preferably 240° to 260° C.

Removal of up to 75% of the water present originally may be achieved by operation up to 250° C., the pressure being maintained above the saturation pressure. The saturation pressure is of course a known parameter for a given temperature; for example, the saturation pressure is 250 p.s.i.a. at 200° C., and 600 p.s.i.a. at 250° C.

The process may be carried out continuously, suitable means being provided to achieve a steady flow of coal through the vessel, with any given spot in the vessel maintaining a steady temperature.

Introduction and removal of the coal may be effected either by screw extrusion through an orifice or by means of auxiliary feed and removal chambers which may be cycled up and down in pressure but not temperature.

Heat recovery is practised using conventional heat exchangers in known manner.

Investigations performed by us on the bonding of water to brown coal, have shown that the energy required to remove at least the first 80% of water from Yallourn coal is no greater than that required to remove liquid water from liquid water, so that the net energy requirements of the process are zero. However, in practice some energy is required to contribute to the raising of the temperature of the waste water and of the dried coal, although this is kept as low as possible by use of suitable heat exchangers.

The overall energy requirement for separation of water from brown coal may be reduced by operation in accordance with this invention to the order of 200 B.t.u. per pound of water removed compared with 1100 B.t.u. for evaporation.

The following example illustrates a specific process carried out according to the invention. It will be appreciated that the invention in its general aspects is in no way limited by the specific details of this example.

Reference is made to the accompanying drawing in which the single FIG. 1 is a diagrammatic representation of the plant employed.

Coal as mined 1 is delivered to a screen 2 taking out oversize (e.g. over 3 inches), undersize going to a combined feed and storage hopper 3.

The hopper supplies the reactor feed via a belt conveyor with magnetic removal of tramp iron (not shown). One reactor 4 is shown although it is preferred to operate a number of reactors in parallel. The reactor has a screw feeding device 5 with air removal per vent 6 part way along its length. The end section of the feeder is a plain cylinder actually inside the reactor shell, with a non-return valve.

The reactor 4 is a long cylinder, heated and insulated to enable the temperature of the contents to reach 250° C. Residence time is less than 20 minutes. Pressure in the reactor is slightly in excess of 600 p.s.i.a.

Coal of reduced water content, mainly in lump form, falls over the end of a bar screen 7 into a screw conveyor 8 discharging to atmospheric pressure through a restraining device.

The liquid phase flowing through the screen 7 contains fine coal and passes to a hydrocyclone 9 to produce a sludge which is dewatered by means of a drum filter 10 and recycled with the feed.

Application of the foregoing process steps to the removal of water from solid organic materials other than brown coal will be quite evident to persons skilled in the art and the invention includes such application.

We claim:
1. Process for separating water from moist solid organic material which comprises, subjecting said material, in the presence of liquid water, to an elevated temperature within the range 240° C.–260° C. and to a pressure exceeding the saturation pressure but below 5000 p.s.i. whereby liquid water is separated from such material whilst such material is under such pressure.

2. Process according to claim 1 in which the solid organic material is brown coal.

3. Process according to claim 1 in which the temperature is within the range 100° C. to 300° C.

4. Process according to claim 1 in which the separation procedure is carried out in a continuous manner.

References Cited

UNITED STATES PATENTS

| | | | |
|---|---|---|---|
| 1,147,808 | 7/1915 | Minton | 34—9 |
| 1,778,515 | 10/1930 | Hampton | 34—9 |
| 1,783,757 | 12/1930 | Von Staden et al. | 34—15 |
| 2,021,990 | 11/1935 | Depew | 34—15 |
| 2,183,924 | 12/1939 | Schoch | 34—9 |
| 3,396,099 | 8/1968 | Glinka | 34—9 |

JOHN J. CAMBY, Primary Examiner

U.S. Cl. X.R.

34—14

UNITED STATES PATENT OFFICE
CERTIFICATE OF CORRECTION

Patent No. 3,552,031                     Dated January 5, 1971

Inventor(s) David Gordon Evans and Stanley Robert Siemon

It is certified that error appears in the above-identified patent and that said Letters Patent are hereby corrected as shown below:

In claim 1, line 4, the words - "within the range 240° C. - 260° C." - should have been omitted; and In claim 1, lines 4 and 5, the word - "exceeding" - should have been replaced by - "at or above".

Signed and sealed this 7th day of March 1972.

(SEAL)
Attest:

EDWARD M. FLETCHER, JR.
Attesting Officer

ROBERT GOTTSCHALK
Commissioner of Patents